United States Patent
Rao et al.

(10) Patent No.: US 12,299,300 B2
(45) Date of Patent: May 13, 2025

(54) HOST DEVICE WITH ADAPTIVE LOAD BALANCING UTILIZING HIGH-PERFORMANCE DRIVERS

(71) Applicant: Dell Products L.P., Round Rock, TX (US)

(72) Inventors: Vinay G. Rao, Bangalore (IN); Mohammad Salim Akhtar, Jamshedpur (IN); Madhu Tarikere, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 60 days.

(21) Appl. No.: 18/121,310

(22) Filed: Mar. 14, 2023

(65) Prior Publication Data

US 2024/0311025 A1 Sep. 19, 2024

(51) Int. Cl.
*G06F 3/06* (2006.01)

(52) U.S. Cl.
CPC .......... *G06F 3/0635* (2013.01); *G06F 3/0611* (2013.01); *G06F 3/0683* (2013.01)

(58) Field of Classification Search
CPC .............................. G06F 3/0635; G06F 3/0683
See application file for complete search history.

(56) References Cited

U.S. PATENT DOCUMENTS

| | | | |
|---|---|---|---|
| 6,567,397 B1 | 5/2003 | Campana, Jr. et al. | |
| 6,687,746 B1 | 2/2004 | Shuster et al. | |
| 6,697,875 B1 | 2/2004 | Wilson | |
| 7,275,103 B1 | 9/2007 | Thrasher et al. | |
| 7,454,437 B1 | 11/2008 | Lavallee et al. | |

(Continued)

FOREIGN PATENT DOCUMENTS

| | | |
|---|---|---|
| CN | 103677927 B | 2/2017 |
| EP | 1117028 A2 | 7/2001 |
| EP | 2667569 A1 | 11/2013 |

OTHER PUBLICATIONS

International Search Report and Written Opinion of PCT/US2019/052549 dated Dec. 4, 2019, 13 pages.

(Continued)

*Primary Examiner* — Hosain T Alam
*Assistant Examiner* — Nicholas A. Paperno
(74) *Attorney, Agent, or Firm* — Ryan, Mason & Lewis, LLP

(57) ABSTRACT

An apparatus illustratively comprises at least one processing device that comprises a processor coupled to a memory. The at least one processing device is configured to maintain in a host device queue depth measures for respective paths over which input-output operations are delivered from the host device to a storage system, and to control path selection for delivery of additional input-output operations from the host device to the storage system based at least in part on the queue depth measures maintained for the paths. The at least one processing device may comprise at least one multi-path input-output driver of the host device, with maintaining the queue depth measures and controlling the path selection being performed at least in part by the at least one multi-path input-output driver of the host device. The multi-path input-output driver illustratively comprises a lockless polled-mode driver implemented in a user space of the host device.

20 Claims, 4 Drawing Sheets

(56) References Cited

U.S. PATENT DOCUMENTS

| | | |
|---|---|---|
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 10,936,220 B2 | 3/2021 | Mallick et al. |
| 10,936,335 B2 | 3/2021 | Mallick et al. |
| 10,949,104 B2 | 3/2021 | Marappan et al. |
| 10,996,879 B2 | 5/2021 | Gokam |
| 11,016,699 B2 | 5/2021 | Anchi et al. |
| 11,016,783 B2 | 5/2021 | Rao et al. |
| 11,044,313 B2 | 6/2021 | Patel et al. |
| 11,044,347 B2 | 6/2021 | Kumar et al. |
| 11,050,660 B2 | 6/2021 | Rao et al. |
| 11,093,155 B2 | 8/2021 | Anchi et al. |
| 11,106,381 B2 | 8/2021 | Rao et al. |
| 11,126,358 B2 | 9/2021 | Kumar et al. |
| 11,126,363 B2 | 9/2021 | Tidke et al. |
| 11,157,203 B2 | 10/2021 | Gokam et al. |
| 11,366,771 B2 | 6/2022 | Smith et al. |
| 11,615,340 B2 | 3/2023 | Mallick et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2004/0078632 A1* | 4/2004 | Infante ............... G06F 3/0613 714/4.2 |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0280991 A1* | 9/2019 | Singh ................. H04L 47/6215 |
| 2019/0334987 A1 | 10/2019 | Mallick et al. |
| 2019/0391913 A1* | 12/2019 | Tseng ................. G06F 13/1668 |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0293465 A1* | 9/2020 | Yang ..................... H04L 49/35 |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1* | 11/2020 | Gokam ................. G06F 3/0611 |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0157502 A1 | 5/2021 | Rao et al. |
| 2021/0181965 A1 | 6/2021 | Anchi et al. |
| 2021/0374071 A1* | 12/2021 | Annapareddy ......... G06F 12/08 |

OTHER PUBLICATIONS

International Search Report and Written Opinion of PCT/US2019/053204 dated Dec. 16, 2019, 40 pages.
International Search Report and Written Opinion of PCT/US2019/053473 dated Dec. 19, 2019, 16 pages.
International Search Report and Written Opinion of PCT/US2019/067144 dated May 4, 2020, 26 pages.
Kris Piepho, "Dell EMC SC Series Storage: Microsoft Multipath I/O," Dell EMC Best Practices, Jan. 2017, 57 pages.
NVM Express, "NVM Express, Revision 1.3," NVM Express, May 1, 2017, 282 pages.
VMware, "Multipathing Configuration for Software ISCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
VMware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.
NVM Express, "NVM Express Base Specification, Revision 2.0a," NVM Express, Jul. 23, 2021, 454 pages.

(56) References Cited

OTHER PUBLICATIONS

NVM Express, "NVM Express Base Specification, Revision 2.0b," NVM Express, Jan. 6, 2022, 455 pages.
Storage Performance Development Kit (SPDK), "What is SPDK," https://spdk.io/doc/about.html, Accessed Feb. 3, 2023, 1 page.

* cited by examiner ized by a storage array shared by multiple host devices over a network.

HOST DEVICE WITH ADAPTIVE LOAD BALANCING UTILIZING HIGH-PERFORMANCE DRIVERS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols. In these and other storage systems, problems can arise when paths from one or more of the host devices to the storage system experience performance issues, possibly attributable at least in part to congestion in a storage area network (SAN). These and other path-related performance issues can lead to excessive IO retries, thereby degrading application performance.

SUMMARY

Illustrative embodiments disclosed herein provide techniques for implementing adaptive load balancing utilizing high-performance drivers in one or more host devices that communicate with one or more storage arrays or other types of storage systems over at least one network. Such techniques can provide enhanced load balancing in a multi-path layer of a given host device in a manner that improves overall performance. Accordingly, in some embodiments, the disclosed techniques are implemented at least in part in a multi-path layer of at least one host device, although such an arrangement is not a requirement.

One or more such embodiments illustratively configure a host device to automatically perform adaptive load balancing in, for example, a Storage Performance Development Kit (SPDK) arrangement. Such an SPDK arrangement is illustratively utilized in some embodiments to provide what is more generally referred to herein as "high-performance drivers." An example SPDK arrangement achieves high performance in illustrative embodiments by moving the drivers into user space of the host device, in a manner which avoids system calls ("syscalls") and enables zero-copy access from an application. Additionally, the example SPDK arrangement illustratively polls hardware for completions instead of relying on interrupts, which lowers both total latency and latency variance, and relies on message passing instead of IO address locks in order to provide further performance enhancements.

Some SPDK arrangements therefore include lockless polled-mode drivers implemented in user space of a host device. Such a lockless polled-mode driver illustratively provides zero-copy, highly parallel access directly to a logical storage volume or other logical storage device from a user space application executing on the host device, although other types of drivers can be used in other embodiments.

Although some embodiments utilize SPDK arrangements, it is to be appreciated that utilization of SPDK is not required, and other embodiments can instead utilize any of a wide variety of other types and configurations of host drivers, including one or more non-SPDK drivers associated with a host multi-path layer.

A significant problem with conventional SPDK arrangements is that their IO load balancing policies are unduly restrictive, and include only a relatively small number of simple policies, such as active-active and active-passive policies. Unfortunately, such policies cannot provide optimal performance in the presence of SAN congestion and under numerous other types of load imbalance conditions.

Illustrative embodiments disclosed herein overcome these and other issues of conventional practice at least in part by through the disclosed techniques for implementing adaptive load balancing utilizing high-performance drivers, in SPDK arrangements and in numerous other IO processing contexts involving one or more host devices communicating with at least one storage array or other type of storage system.

A multi-path layer in some embodiments illustratively comprises at least one multi-path input-output (MPIO) driver configured to process IO operations of at least one host device that communicates with one or more storage arrays or other types of storage systems over designated paths through a SAN or other type of network.

Other types of host drivers or other host device components can be used in place of or in addition to one or more MPIO drivers in implementing functionality for adaptive load balancing as disclosed herein.

In an illustrative embodiment, an apparatus comprises at least one processing device that includes a processor and a memory, with the processor being coupled to the memory. The at least one processing device is configured to maintain in a host device a plurality of queue depth measures for respective ones of a plurality of paths over which IO operations are delivered from the host device to a storage system, and to control path selection for delivery of additional IO operations from the host device to the storage system based at least in part on the queue depth measures maintained for the plurality of paths.

The at least one processing device illustratively comprises at least a portion of the host device. Other embodiments can include multiple host devices, with each such host device implementing similar functionality.

In some embodiments, the at least one processing device may comprise at least one MPIO driver of the host device, with maintaining the queue depth measures and controlling the path selection being performed at least in part by the at least one MPIO driver of the host device. The MPIO driver in some embodiments illustratively comprises a lockless polled-mode driver implemented in a user space of the host device, such as a driver implemented at least in part utilizing an otherwise conventional SPDK arrangement, although other types of host device drivers can be used in other embodiments.

In some embodiments, the paths over which the IO operations are delivered from the host device to the storage system correspond to respective initiator-target pairs, with the initiators of the initiator-target pairs comprising respective host bus adaptors of the host device and the targets of the initiator-target pairs comprising respective ports of the storage system. Other types of initiators and targets can be used in other embodiments.

A given one of the queue depth measures in some embodiments illustratively provides an indication of a number of pending IO operations for the corresponding path. In such an embodiment, the pending IO operations illustratively comprise respective IO operations that have been sent from the host device to the storage system over the path but have not yet completed processing in the storage system.

Additionally or alternatively, the at least one processing device in some embodiments comprises a plurality of processing cores of the host device, with a first one of the plurality of processing cores being configured to update the queue depth measures for respective ones of the plurality of paths based at least in part on messages received from one or more other ones of the plurality of processing cores.

In some embodiments, the first processing core implements a circular ring buffer to store at least portions of the messages received from the one or more other ones of the plurality of processing cores.

The processing cores in some embodiments implement respective ones of a plurality of lockless polled-mode drivers. In such an embodiment, the above-noted messages are illustratively received in the first processing core from the lockless polled-mode drivers of respective ones of the other processing cores.

In some embodiments, controlling path selection for delivery of additional IO operations from the host device to the storage system based at least in part on the queue depth measures maintained for the plurality of paths comprises implementing in each of a plurality of lockless polled-mode drivers of the host device an adaptive load balancing algorithm that utilizes the queue depth measures.

For example, a given one of the adaptive load balancing algorithms is illustratively configured to select for delivery of a given one of the additional IO operations a particular path having a lowest queue depth measure of the plurality of queue depth measures maintained for respective ones of the plurality of paths. Other types of adaptive load balancing selections can be used to implement other policies in a given embodiment.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
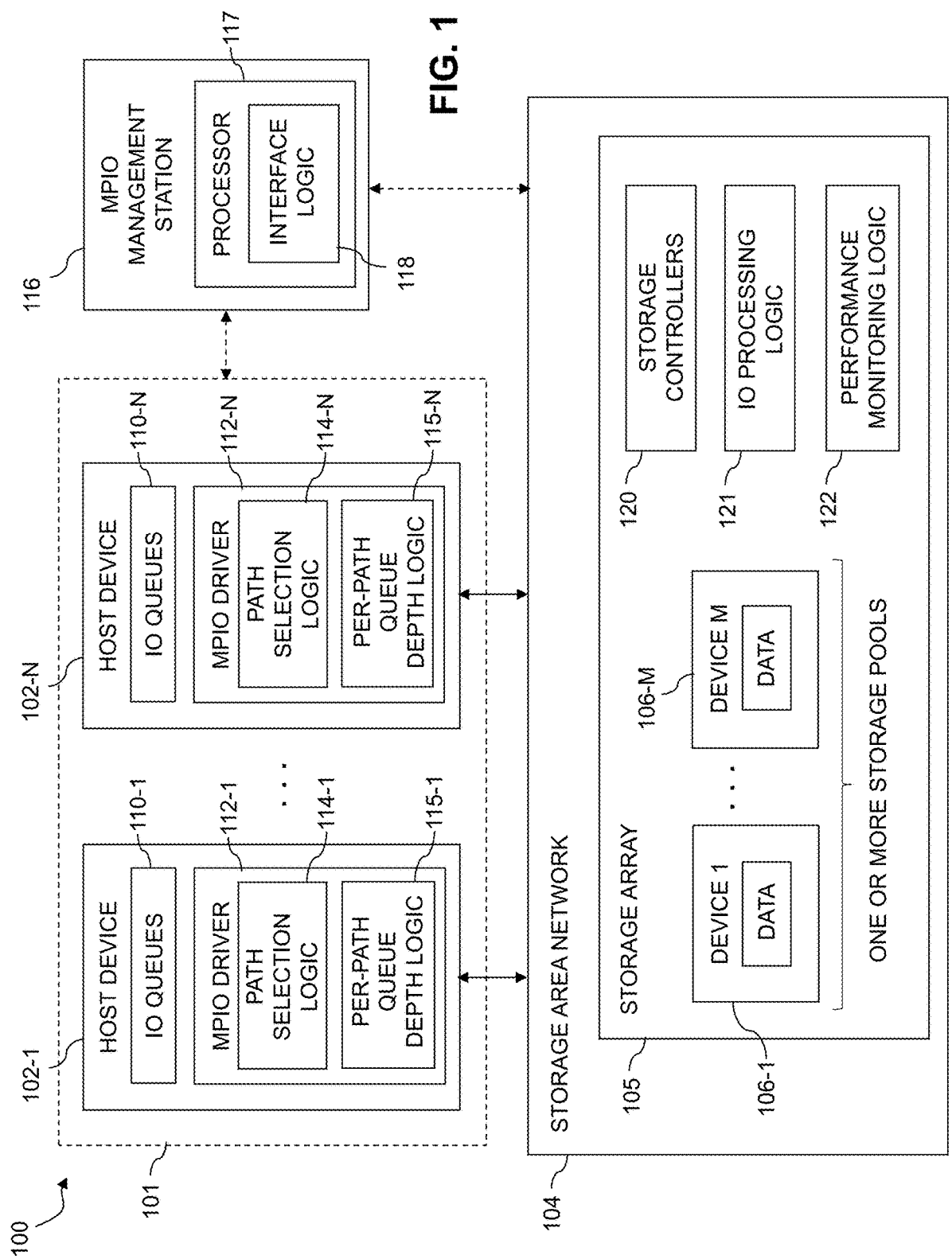
FIG. 1 is a block diagram of an information processing system configured with functionality for adaptive load balancing in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 over the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for adaptive load balancing as disclosed herein. Such functionality is provided at least in part using respective instances of per-path queue depth logic 115-1, . . . 115-N implemented within the MPIO drivers 112, illustratively operating in cooperation with their corresponding instances of path selection logic 114. Although the instances of per-path queue depth logic 115 are shown as being implemented within respective MPIO drivers 112 in this embodiment, this is by way of illustrative example only, and in other embodiments the instances of per-path queue depth logic 115 can be implemented at least in part elsewhere in the respective host devices 102.

The MPIO drivers 112 may comprise, for example, otherwise conventional MPIO drivers, such as PowerPath® drivers from Dell Technologies, suitably modified in the manner disclosed herein to provide functionality for adaptive load balancing. Other types of MPIO drivers from other driver vendors may be suitably modified to incorporate functionality for adaptive load balancing as disclosed herein.

The host devices 102 can include additional or alternative components. For example, in some embodiments, the host devices 102 comprise respective local caches, implemented using respective memories of those host devices. A given such local cache can be implemented using one or more cache cards. A wide variety of different caching techniques can be used in these and other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105. The MPIO management station 116, or portions thereof, may be considered in some embodiments as forming part of what is referred to herein as a "multi-path layer" that includes the MPIO drivers 112 of the host devices 102.

The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station 116 is an example of what is more generally referred to herein as an "external server" relative to the storage array 105. Additional or alternative external servers of different types can be used in other embodiments. In some embodiments, one or more external servers, such as the MPIO management station 116, perform at least a portion of the functionality for adaptive load balancing as disclosed herein, illustratively in cooperation with the storage array 105 and the instances of per-path queue depth logic 115 of the respective MPIO drivers 112.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the SAN 104 in order to determine the negotiated rate, potentially leading to substantial mismatches in initiator and target negotiated rates for the same switch, set of switches or switch fabric of the SAN 104.

The term "negotiated rate" therefore illustratively comprises a rate negotiated between an initiator or a target and a switch of a switch fabric of the SAN 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeoF), NVMe over TCP (NVMe/TCP), and/or others. The MPIO management station 116 in some embodiments is similarly configured to communicate directly with the storage array 105 using one or more such storage access protocols.

The MPIO driver 112-1 on the host device 102-1 illustratively has connectivity to the MPIO management station 116. The MPIO management station 116 in some embodiments implements PowerPath® Management Appliance (PPMA) functionality to obtain access to the host devices 102 and the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to facilitate adaptive load balancing as disclosed herein. For example, multi-pathing software residing on one or more of the host devices 102 (e.g., a server such as an ESXi server or an AIX server) is utilized in illustrative embodiments to support adaptive load balancing.

In the FIG. 1 embodiment, the storage array 105 comprises a plurality of storage controllers 120, IO processing logic 121 and performance monitoring logic 122. The IO processing logic 121 illustratively performs various types of actions for IO operations received from the host devices 102, such as reading data from and writing data to the storage devices 106, under the control of the storage controllers 120. The performance monitoring logic 122 monitors the processing of IO operations in the storage array 105 and illustratively computes performance metrics such as throughput and latency and maintains associated statistics relating to such processing, for example, on a per-LUN basis. In other embodiments, at least portions of one or more of the IO processing logic 121 and the performance monitoring logic 122 can be implemented at least in part external to the storage array 105 rather than internal to the storage array 105. For example, in some embodiments at least portions of the IO processing logic 121 and/or the performance monitoring logic 122 are implemented on one or more servers that are external to the storage array 105. Accordingly, such logic components may be located internal to the storage array 105, external to the storage array 105, or implemented in part internally and in part externally to the storage array 105, and can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), "vendor unique" or VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

As indicated above, illustrative embodiments overcome various drawbacks of conventional practice by configuring the system 100 to include functionality for adaptive load balancing, as will now be described in more detail.

For example, problems can arise when paths from one or more of the host devices 102 to the storage array 105 experience performance issues, possibly attributable at least in part to congestion in the SAN 104. These and other path-related performance issues can lead to excessive IO retries, thereby degrading application performance.

Illustrative embodiments disclosed herein provide techniques for implementing adaptive load balancing utilizing high-performance drivers in one or more host devices that communicate with one or more storage arrays or other types of storage systems over at least one network. Such techniques can provide enhanced load balancing in a multi-path layer of a given host device in a manner that improves overall performance. Accordingly, in some embodiments, the disclosed techniques are implemented at least in part in a multi-path layer of at least one host device, although such an arrangement is not a requirement.

One or more such embodiments illustratively configure a host device to automatically perform adaptive load balancing in, for example, a Storage Performance Development Kit (SPDK) arrangement. Such an SPDK arrangement is illustratively utilized in some embodiments to provide what is more generally referred to herein as "high-performance drivers." An example SPDK arrangement achieves high performance in illustrative embodiments by moving the drivers into user space of the host device, in a manner which avoids system calls ("syscalls") and enables zero-copy access from an application. Additionally, the example SPDK arrangement illustratively polls hardware for completions instead of relying on interrupts, which lowers both total latency and latency variance, and relies on message passing instead of IO address locks in order to provide further performance enhancements.

Some SPDK arrangements therefore include lockless polled-mode drivers implemented in user space of a host device. Such a lockless polled-mode driver illustratively provides zero-copy, highly parallel access directly to a logical storage volume or other logical storage device from a user space application executing on the host device, although other types of drivers can be used in other embodiments.

The MPIO drivers 112 in illustrative embodiments herein are implemented as respective high-performance drivers, and more particularly as lockless polled-mode drivers implemented in user space of their corresponding host device, illustratively in accordance with an SPDK arrangement. In some embodiments, each of the host devices 102 comprises a plurality of processing cores, with one of the MPIO drivers being associated with each of the processing cores of the host device. A given such host device therefore comprises multiple high-performance drivers, each illustratively implemented as an instance of an MPIO driver, and more particularly as a lockless polled-mode driver.

Although some embodiments utilize SPDK arrangements, it is to be appreciated that utilization of SPDK is not required, and other embodiments can instead utilize any of a wide variety of other types and configurations of host drivers, including one or more non-SPDK drivers associated with a host multi-path layer.

A significant problem with conventional SPDK arrangements is that their IO load balancing policies are unduly restrictive, and include only a relatively small number of simple policies, such as active-active and active-passive policies. Unfortunately, such policies cannot provide optimal performance in the presence of SAN congestion and under numerous other types of load imbalance conditions.

Illustrative embodiments disclosed herein overcome these and other issues of conventional practice at least in part by through the disclosed techniques for implementing adaptive load balancing utilizing high-performance drivers, in SPDK arrangements and in numerous other IO processing contexts involving one or more host devices communicating with at least one storage array or other type of storage system.

For example, in the FIG. 1 embodiment, the host device 102-1 is illustratively configured, at least in part via its MPIO driver 112-1 and the corresponding path selection logic 114-1 and per-path queue depth logic 115-1, to control delivery of IO operations to storage array 105 over selected ones of a plurality of paths through SAN 104, where the paths are associated with respective initiator-target pairs, the initiators being implemented on the host device 102-1 and the targets being implemented on the storage array 105. More particularly, the initiators of the initiator-target pairs illustratively comprise respective HBAs of the host device 102-1 and the targets of the initiator-target pairs illustratively comprising respective storage array ports of the storage array 105.

Other types of paths involving other types of initiators and targets can be used in other embodiments. Terms such as "initiator," "target" and "initiator-target pair" as used herein are therefore intended to be broadly construed. A given initiator-target pair is also referred to in some embodiments herein as an initiator-target (IT) nexus.

The host device 102-1 is further configured to maintain a plurality of queue depth measures for respective ones of a plurality of paths over which IO operations are delivered from the host device 102-1 to the storage array 105, and to control path selection for delivery of additional IO operations from the host device 102-1 to the storage array 105 based at least in part on the queue depth measures maintained for the plurality of paths.

Such queue depth measures illustratively provide respective indicators of per-path queue depth for respective ones of the plurality of paths over which IO operations are delivered from the host device 102-1 to the storage array 105.

The host device 102-1 is an example of what is more generally referred to herein as "at least one processing device" comprising a processor and a memory, with the processor being coupled to the memory. References herein to "at least one processing device" may instead comprise a portion of the host device 102-1, or at least a portion of multiple host devices 102, with each such host device implementing similar functionality. Other types of arrangements of one or more processing devices can be used to implement functionality for adaptive load balancing as disclosed herein.

In some embodiments, the MPIO driver 112-1 of host device 102-1 more particularly comprises or is otherwise associated with multiple high-performance drivers, such as one or more lockless polled-mode drivers implemented in a user space of the host device. These lockless polled-mode drivers, which are examples of "high-performance drivers" as that term is broadly used herein, may be configured in accordance with an SPDK arrangement, although use of SPDK is not required in illustrative embodiments. Accordingly, references herein to an MPIO driver of a host device are intended to be broadly construed so as to encompass, for example, multiple instances of a particular MPIO driver within a given host device as well as an MPIO driver that itself includes multiple driver instances. In some embodiments, one or more such MPIO drivers perform at least a portion of the above-noted maintaining of the queue depth measures and controlling of the path selection based at least in part on the queue depth measures, although additional or alternative host device components can be used to implement at least portions of this functionality in illustrative embodiments.

In some embodiments, a given one of the queue depth measures provides an indication of a number of pending IO operations for the corresponding path, where the pending IO operations comprise respective IO operations that have been sent from the host device 102-1 to the storage array 105 over the path but have not yet completed processing in the storage array 105. Such pending operations are also referred to herein as respective "in-flight" IO operations, although other types of pending IO operations can be used in maintaining the queue depth measures in other embodiments.

The host device 102-1 in some embodiments comprises a plurality of processing cores, with a first one of the plurality of processing cores being configured to update the queue depth measures for respective ones of the plurality of paths based at least in part on messages received from one or more other ones of the plurality of processing cores. An example of such a multi-core embodiment is described in more detail below in conjunction with FIG. 4.

In one or more such embodiments, the first processing core implements a circular ring buffer to store at least portions of the messages received from the one or more other ones of the plurality of processing cores. Other types of buffering arrangements can be used to process such messages in other embodiments.

The multiple processing cores of the host device 102-1 in some embodiments implement respective ones of a plurality of lockless polled-mode drivers, each illustratively comprising at least a portion of at least one instance of MPIO driver 112-1, with the messages being received in the first processing core from the lockless polled-mode drivers of respective ones of the other processing cores.

In some embodiments, controlling path selection for delivery of additional IO operations from the host device 102-1 to the storage array 105 based at least in part on the queue depth measures maintained for the plurality of paths comprises implementing in each of a plurality of lockless polled-mode drivers of the host device 102-1 an adaptive load balancing algorithm that utilizes the queue depth measures.

As one illustrative example, a given one of the adaptive load balancing algorithms in some embodiments is configured to select for delivery of a given one of the additional IO operations a particular path having a lowest queue depth measure of the plurality of queue depth measures maintained for respective ones of the plurality of paths.

Other types of adaptive load balancing algorithms can be used in other embodiments. For example, additional or alternative types of adaptive load balancing selections can be made based at least in part on the queue depth measures to implement other load balancing policies in other illustrative embodiments.

Although described in the context of some embodiments as being performed at least in part by the MPIO driver 112-1 utilizing path selection logic 114-1 and per-path queue depth logic 115-1, at least portions of the above-described functionality can be performed elsewhere within the host device 102-1. Also, other ones of the MPIO drivers 112 and their respective other host devices 102 can be similarly configured.

An example of a process including functionality of the type outlined above will be described below in conjunction with the flow diagram of FIG. 2. These and other processes referred to herein as being performed by one or more host devices operating in conjunction with one or more storage arrays of a storage system can in other embodiments involve additional or alternative system components, possibly including one or more external servers such as MPIO management station 116.

As noted above, the initiators of the initiator-target pairs illustratively comprise respective HBAs of the host device 102-1 and the targets of the initiator-target pairs comprise respective storage array ports of the storage array 105.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple WWNs or WWIDs to the SAN 104 and the storage array 105. A WWN or WWID is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

One such case is an implementation of system 100 that utilizes VMs, where multiple VMs run on a single ESXi server with HBAs. In such an arrangement, all VMs are using all HBAs but there is a need to be able to distinguish which IO belongs to which VM, for example, in order to implement service level objectives (SLOs) between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, multiple virtual initiators are associated with a single HBA of the host device 102-1 but have respective unique identifiers associated therewith.

Additionally or alternatively, different ones of the multiple virtual initiators are illustratively associated with respective different ones of a plurality of virtual machines of the host device that share a single HBA of the host device, or a plurality of logical partitions of the host device that share a single HBA of the host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

The above-described functionality for adaptive load balancing is illustratively performed at least in part by the instances of per-path queue depth logic 115 in respective ones of the MPIO drivers 112 of the multi-path layer, possibly operating in conjunction with their corresponding instances of path selection logic 114. However, it is to be appreciated that additional or alternative system components can participate in the disclosed functionality for adaptive load balancing in illustrative embodiments, including additional or alternative host device components and/or MPIO management station 116.

These and other illustrative embodiments disclosed herein provide functionality for adaptive load balancing, with at least portions of that functionality being implemented using one or more MPIO drivers of a multi-path layer of at least one host device. The MPIO drivers can comprise PowerPath® drivers suitably modified to implement the techniques disclosed herein. Other types of host multi-pathing software from other vendors can be similarly modified to implement the techniques disclosed herein. Again, MPIO drivers are not required, and other types of host drivers or more generally other host device components can be used.

As described above, in illustrative embodiments disclosed herein, the host devices 102 are configured to interact with storage array 105 to provide adaptive load balancing between host devices 102 and storage array 105.

For example, in some embodiments, the MPIO driver 112-1 of host device 102-1 is illustratively configured to implement at least portions of adaptive load balancing functionality that includes maintaining in the host device 102-1 a plurality of queue depth measures for respective ones of a plurality of paths over which IO operations are delivered from the host device 102-1 to the storage array 105, and controlling path selection for delivery of additional IO operations from the host device 102-1 to the storage array 105 based at least in part on the queue depth measures maintained for the plurality of paths.

An example of an algorithm performed by the host device 102-1 utilizing its MPIO driver 112-1 and corresponding instances of path selection logic 114-1 and per-path queue depth logic 115-1 will now be described.

As indicated previously, some SPDK arrangements implement a message passing mechanism. Such a mechanism in illustrative embodiments disclosed herein is implemented between multiple central processing unit (CPU) cores of a given multi-core host device. High performance and throughput are achieved in illustrative SPDK embodiments by avoiding the need for address locks in IO dispatch and completion. Such arrangements are therefore also referred to herein as being "lockless" arrangements.

Accordingly, the host device 102-1 in the present embodiment is assumed to comprise multiple processing cores, with each such processing core more particularly comprising a CPU core, although it is to be appreciated that other types and arrangements of cores can be used in other embodiments.

In some embodiments, the host device 102-1 is configured to provide an enhanced SPDK configuration that implements an adaptive load balancing policy in a multi-pathing layer to address imbalances that may arise due to issues such as SAN congestion.

For example, an adaptive load balancing policy as disclosed herein is illustratively configured to perform load balancing based at least in part on per-path queue depths maintained for each IT nexus, where a given IT nexus refers to a particular initiator-target pair corresponding to a physical path between the host device and the storage array.

As indicated above, the per-path queue depth illustratively refers to the number of pending IOs on each IT nexus, or in other words, the number of IOs that were already dispatched over the corresponding path but are yet to be completed. Such IOs in some embodiments may also be referred to as "in-flight" IOs. Other queue depth configurations may be used in other embodiments.

The example algorithm illustratively includes the following steps, although additional or alternative steps can be used, possibly with different ordering of these and other steps, in other embodiments:

1. A given one of the multiple CPU cores of the multi-core host device, illustratively a first CPU core, is designated to update the queue depth for each IT nexus.

2. To keep the IO dispatch and completion lockless, an SPDK instance running on each CPU core sends asynchronous messages to the first CPU core for use in updating the per-path queue depth of each IT nexus periodically.

3. The first CPU core illustratively maintains a lockless circular ring buffer or other suitable arrangement of one or more buffers and/or data structures to store the messages from other cores and uses the messages to update the pre-path queue depth. The SPDK instance on each CPU core has access to the queue depth of each IT nexus. An IT nexus which is relatively slow will have a higher queue depth than an IT nexus that is relatively fast.

4. An adaptive load balancing algorithm implemented in each SPDK instance chooses the path with the least queue depth during path selection for IO dispatch.

This example algorithm results in better performance in the presence of SAN congestion and imbalance relative to conventional SPDK arrangements.

For example, some embodiments showed as much as about 70% to 80% improvement in performance relative to a default SPDK active-active load balancing policy using round-robin selection of paths. Also, better distribution of IO load was achieved by the disclosed adaptive load balancing based on queue depth.

It is to be appreciated that the particular steps of the algorithm described above are presented by way of illustrative example only, and additional or alternative steps can be used in other embodiments. Also, the order of the steps can be varied, and/or at least some of the steps can be performed at least in part in parallel with one another.

Illustrative embodiments can be implemented, for example, in one or more MPIO drivers of one or more host devices, with such MPIO drivers collectively providing a multi-path layer of the host devices.

For example, some embodiments are implemented though modification of otherwise conventional multi-pathing software, such as PowerPath® drivers commercially available from Dell Technologies. Other embodiments can be implemented in other MPIO drivers from other multi-pathing software vendors.

Illustrative embodiments disclosed herein can provide adaptive load balancing for a wide variety of different types of host devices, such as host devices comprising ESXi servers or AIX servers.

Additional examples of arrangements for adaptive load balancing will be described elsewhere herein in conjunction with the embodiments of FIGS. 2 through 4. Other types of arrangements for adaptive load balancing can be used in other embodiments.

These and other functions related to adaptive load balancing that are referred to herein as being performed by or under the control of the MPIO drivers 112 through interaction with the storage array 105 can in some embodiments be performed at least in part outside of MPIO drivers 112 utilizing other system components.

The above-described functions associated with adaptive load balancing in the MPIO driver 112-1 in some embodiments are carried out at least in part under the control of its per-path queue depth logic 115-1, illustratively operating in cooperation with path selection logic 114-1. For example, the per-path queue depth logic 115-1 is illustratively configured to control performance of portions of an algorithm comprising the steps of the process in the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for adaptive load balancing.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known multi-pathing software functionality. Such conventional multi-pathing software functionality is suitably modified in illustrative embodiments disclosed herein to support adaptive load balancing.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Base Specification, Revision 2.0b, Jan. 6, 2022, which is incorporated by reference herein. Other NVMe storage access protocols of this type that may be utilized in illustrative embodiments disclosed herein include NVMe/FC, NVMeoF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues.

As mentioned above, communications between the host devices 102 and the storage array 105 may utilize PCIe connections or other types of connections implemented over one or more networks, using interfaces and protocols as previously described. Numerous other interfaces and associated protocols can be used in other embodiments.

The storage array 105 in some embodiments may be implemented as part of cloud infrastructure in the form of a cloud-based system. Such a cloud-based system can additionally or alternatively be used to implement other portions of system 100, such as the host devices 102 and the MPIO management station 116.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more PowerStore™ and/or PowerMax™ storage arrays, commercially available from Dell Technologies. Numerous other types of storage arrays can be used in other embodiments.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements. Other embodiments can be configured to utilize asymmetric namespace access (ANA) arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and per-path queue depth logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 204, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
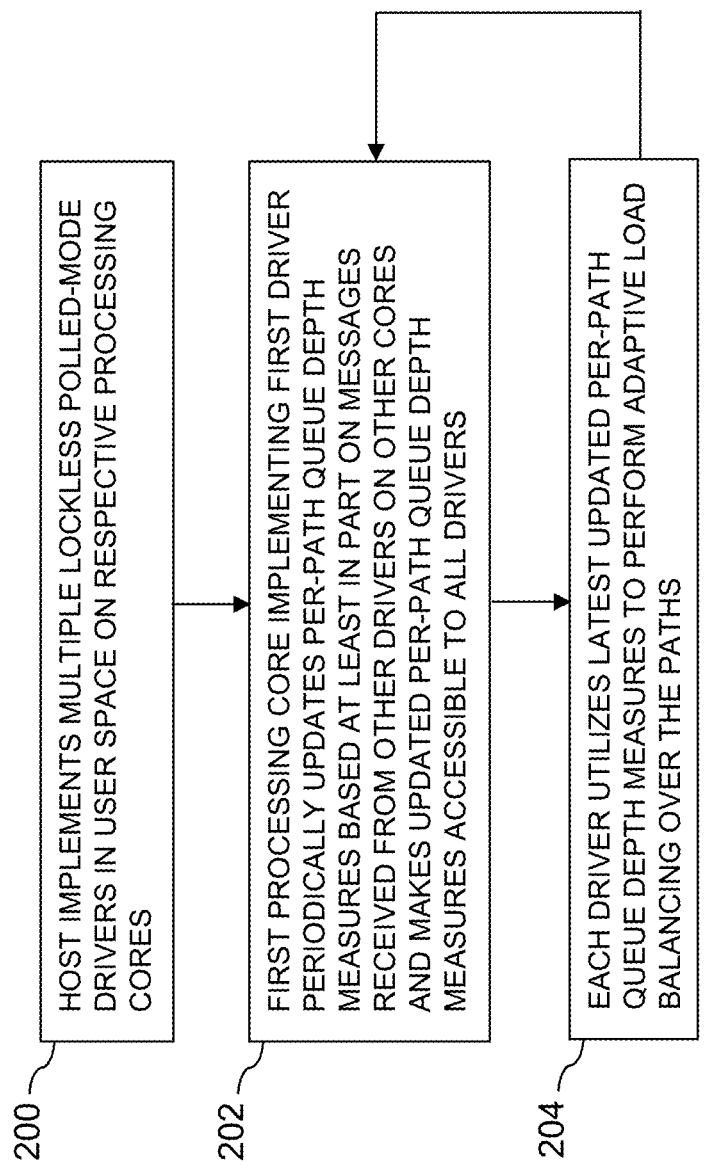
FIG. 2 is a flow diagram of a process for adaptive load balancing in an illustrative embodiment.

The steps of the FIG. 2 process are illustratively performed at least in part by or under the control of a multi-path layer comprising one or more MPIO drivers of at least one host devices, cooperatively interacting with a storage array or other storage system, and possibly some participation by one or more additional components such as an external server comprising an MPIO management station. Other arrangements of additional or alternative system components can be configured to perform at least portions of one or more of the steps of the FIG. 2 process in other embodiments.

The steps shown in FIG. 2 more specifically relate to processing performed by a given host device, also referred to in some description herein as simply a "host," interacting with a storage array, and possibly an MPIO management station. It is assumed that similar processes are implemented for each of a plurality of additional hosts that interact with the storage array. An MPIO management station is not required in this embodiment and other illustrative embodiments disclosed herein.

In step 200, a host implements multiple lockless polled-mode drivers in user space on respective processing cores. The lockless polled-mode drivers are illustratively implemented in accordance with an SPDK arrangement, although it is to be appreciated that use of SPDK arrangements is not a requirement.

In step 202, a first processing core implementing a first one of the drivers periodically updates per-path queue depth measures for a plurality of paths associated with respective initiator-target pairs, based at least in part on messages received from other ones of the drivers on other ones of the processing cores, and makes the resulting updated per-path queue depth measures accessible to all drivers.

In step 204, each driver utilizes the latest updated per-path queue depth measures to perform adaptive load balancing over the paths.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for adaptive load balancing. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements for adaptive load balancing within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
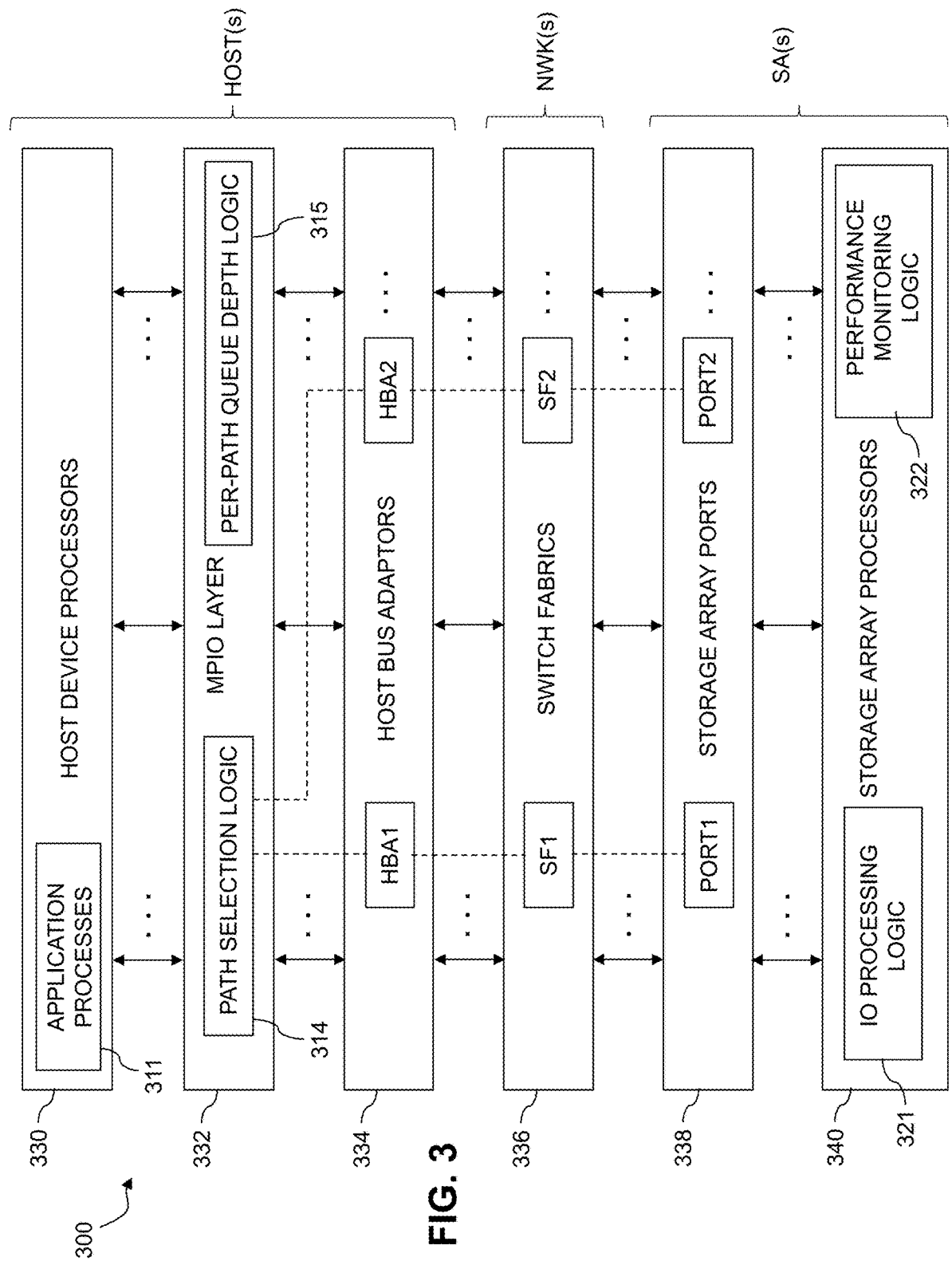
FIG. 3 is a block diagram showing multiple layers of a layered system architecture that incorporates functionality for adaptive load balancing in an illustrative embodiment.

Referring now to FIG. 3, another illustrative embodiment is shown. In this embodiment, an information processing system 300 comprises host-side elements that include application processes 311, path selection logic 314 and per-path queue depth logic 315, and storage-side elements that include IO processing logic 321 and performance monitoring logic 322. There may be separate instances of one or more such elements associated with each of a plurality of storage arrays of the system 300. Components 314, 315, 321 and 322 of system 300 generally operate in a manner similar to that previously described for respective corresponding components 114, 115, 121 and 122 of the system 100 of FIG. 1.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs"). The storage array processors of the storage array processor layer 340 may be viewed as corresponding to one or more storage controllers such as the storage controllers 120 of the storage array 105.

The application processes 311 of the host device processor layer 330 generate IO operations that are processed by the MPIO layer 332 for delivery to the one or more storage arrays over the SAN comprising switch fabrics of switch fabric layer 336, using adaptive load balancing as disclosed herein. Paths are determined by the path selection logic 314 for sending such IO operations to the one or more storage arrays.

The MPIO layer 332 is an example of what is also referred to herein as a multi-path layer, and comprises one or more MPIO drivers implemented in respective host devices. Each such MPIO driver illustratively comprises respective instances of path selection logic 314 and per-path queue depth logic 315 configured as previously described. Additional or alternative layers and logic arrangements can be used in other embodiments.

The MPIO drivers in some embodiments are configured as respective high-performance drivers, such as lockless polled-mode drivers implemented in a user space of one or more of the host devices. Such high-performance drivers are illustratively deployed in accordance with an SPDK arrangement.

In a manner similar to that described elsewhere herein, the MPIO layer 332 comprising path selection logic 314 and per-path queue depth logic 315 illustratively processes a plurality of IO operations generated by a given host device. The IO operations are sent by the MPIO layer 332 to a storage array over respective paths selected using one or more algorithms implemented by path selection logic 314. The path selection performed by path selection logic 314 illustratively utilizes per-path queue depth measures maintained at least in part by or under the control of the per-path queue depth logic 315.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of k paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays. Again, such path selection performed by path selection logic 314 illustratively utilizes per-path queue depth measures maintained at least in part by or under the control of the per-path queue depth logic 315.

In an example process for adaptive load balancing in the system 300, the MPIO layer 332, illustratively via its MPIO drivers and their associated instances of per-path queue depth logic 315, maintains a plurality of queue depth measures for respective ones of a plurality of paths over which IO operations are delivered from a given host device to one or more storage arrays. The MPIO layer 332, illustratively via its MPIO drivers and their associated instances of path selection logic 314, controls path selection for delivery of additional IO operations from the given host device to the one or more storage arrays based at least in part on the queue depth measures maintained for the plurality of paths. In some embodiments, this control of path selection may include, for example, adjusting one or more parameters utilized by a path selection algorithm implemented by path selection logic 314.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Figure 4:
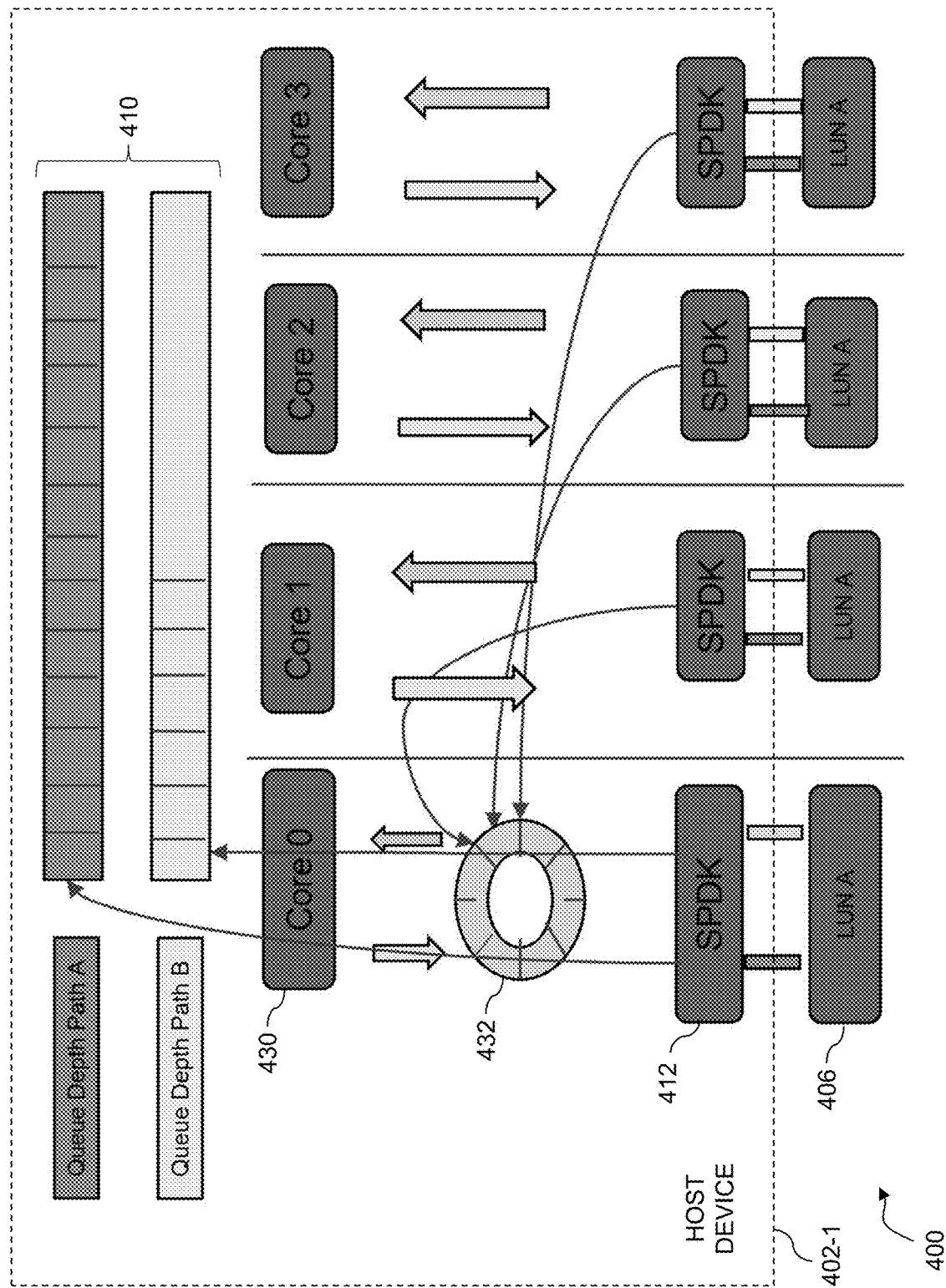
FIG. 4 illustrates the operation of an example information processing system implementing adaptive load balancing in an illustrative embodiment.

Referring now to FIG. 4, another example information processing system 400 implementing adaptive load balancing in an illustrative embodiment is shown. The system 400 as shown includes at least one host device 402-1, and accordingly may include one or more additional host devices that are not shown but are each assumed to be configured in a manner similar to host device 402-1. The host device 402-1 includes separate queues 410 for respective different ones of a plurality of paths, illustratively denoted as Path A and Path B, over which IO operations are delivered from the host device 402-1 to access a particular logical storage volume 406, also denoted as LUN A, of a storage system that is not explicitly shown in the figure.

The host device 402-1 maintains queue depth measures for respective ones of Path A and Path B. Although only two paths are used in this example, this is for simplicity and clarity of illustration only, and it is to be appreciated that there can be a much larger number of paths in a given implementation of such an embodiment. A given one of the queue depth measures illustratively provides an indication of a number of pending IO operations for the corresponding path, where the pending IO operations comprise respective IO operations that have been sent from the host device to the storage system over the path but have not yet completed processing in the storage system. Such queue depth measures, which are illustratively maintained on a per-path basis, are also referred to herein as "per-path" queue depth measures.

The host device 402-1 is also configured to control path selection for delivery of additional IO operations from the host device to the storage system based at least in part on the queue depth measures maintained for Path A and Path B.

In this embodiment, the host device 402-1 includes a plurality of lockless polled-mode drivers 412 implemented in a user space of the host device 402-1. The lockless polled-mode drivers 412 are illustratively shown in the figure as respective SPDK instances each having access via Path A and Path B to LUN A in the storage system. The lockless polled-mode drivers 412 may be implemented at least in part as one or more MPIO drivers of the host device 402-1, although other driver arrangements can be used.

The host device 402-1 further comprises a plurality of processing cores 430, respectively denoted as Core 0, Core 1, Core 2 and Core 3, each illustratively a different CPU core of the host device 402-1, although different numbers, types and arrangements of processing cores can be used in other embodiments. The lockless polled-mode drivers 412 execute on or are otherwise associated with respective ones of the processing cores 430. A given one of the multiple cores of the host device 402-1, illustratively Core 0, is designated to update the per-path queue depth measures for each of the two paths Path A and Path B, periodically or under other specified conditions. As indicated previously herein, each such path is associated with an initiator-target pair, also referred to herein as an IT nexus.

In this embodiment, Core 0 is more particularly configured to update the per-path queue depth measures for respective ones of Path A and Path B based at least in part on messages received from one or more other ones of the processing cores. Such messages illustratively comprise asynchronous messages sent by Core 1, Core 2 and Core 3 for use in updating the queue depth measures.

As illustrated, Core 0 illustratively maintains a lockless circular ring buffer 432 to store the messages from other cores and uses the messages to update the per-path queue depth measures. The SPDK instance on each CPU core has access to the queue depth of each path. A path which is relatively slow will have a higher queue depth than a path that is relatively fast. An adaptive load balancing algorithm implemented in each SPDK instance chooses the path with the least queue depth during path selection for IO dispatch.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for adaptive load balancing can be performed using different system components.

For example, various aspects of functionality for adaptive load balancing in some embodiments can be implemented at least in part using one or more servers that are external to a storage array 105 or other type of storage system. Also, processing logic can be implemented using other types of host drivers, such as, for example, iSCSI drivers, or more generally other host device components.

The particular arrangements described above for adaptive load balancing are therefore presented by way of illustrative example only. Numerous alternative arrangements of these and other features can be used in implementing the adaptive load balancing in other illustrative embodiments.

As indicated previously, the illustrative embodiments disclosed herein can provide a number of significant advantages relative to conventional arrangements.

For example, some embodiments provide techniques for implementing adaptive load balancing utilizing high-performance drivers, such as lockless polled-mode drivers implemented in user space of one or more host devices that communicate with one or more storage arrays or other types of storage systems over at least one network. Such techniques can provide enhanced load balancing in a multi-path layer of a given host device in a manner that improves overall performance.

Some embodiments overcome significant drawbacks relating to unduly restrictive IO load balancing policies of conventional SPDK arrangements.

For example, such embodiments overcome these and other issues of conventional practice at least in part by through the disclosed techniques for implementing adaptive load balancing utilizing high-performance drivers, in SPDK arrangements and in numerous other IO processing contexts involving one or more host devices communicating with at least one storage array or other type of storage system.

Illustrative embodiments disclosed herein can provide significantly improved overall performance in the presence of SAN congestion and under numerous other types of load imbalance conditions.

For example, some embodiments showed as much as about 70% to 80% improvement in performance relative to a default SPDK active-active load balancing policy using round-robin selection of paths. Also, better distribution of IO load was achieved by the disclosed adaptive load balancing based on queue depth.

Various aspects of functionality associated with adaptive load balancing as disclosed herein can be implemented in a host device, in a storage system, or partially in a host device and partially in a storage system, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems implemented at least in part using virtualization infrastructure such as virtual machines and associated hypervisors. For example, virtual machines provided in such systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and per-path queue depth logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, initiators, targets, path selection logic, per-path queue depth logic, interface logic, buffers, and additional or alternative components. Also, the particular configurations of system and device elements and associated processing operations illustratively shown in the drawings can be varied in other embodiments. For example, a wide variety of different host device and storage system configurations and associated arrangements for adaptive load balancing can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to maintain in a host device a plurality of queue depth measures for respective ones of a plurality of paths over which input-output operations are delivered from the host device to a storage system; and
   to control path selection for delivery of additional input-output operations from the host device to the storage system based at least in part on the queue depth measures maintained for the plurality of paths;
   wherein a given one of the queue depth measures provides an indication of a number of pending input-output operations for the corresponding path; and
   wherein the at least one processing device comprises a plurality of processing cores of the host device and further wherein a first one of the plurality of processing cores is designated from among the plurality of processing cores to update the queue depth measures on behalf of all of the processing cores and is configured to update the queue depth measures for respective ones of the plurality of paths based at least in part on inter-core messages received by the first processing core from respective other ones of the plurality of processing cores, the inter-core messages received by the first processing core from the respective other ones of the plurality of processing cores indicating respective numbers of pending input-output operations for the respective other ones of the processing cores, the inter-core messages being stored in a lockless circular ring buffer of the first processing core;
   the first processing core obtaining information from respective ones of the inter-core messages received from the respective other ones of the processing cores, and generating the updated queue depth measures utilizing the obtained information, the obtained information indicating, for a corresponding one of the respective other ones of the processing cores, one or more pending input-output operations of that processing core for at least one of the plurality of paths;
   the updated queue depth measures generated by the first processing core being utilized by each of the first processing core and the other ones of the processing cores in selecting paths for delivery of corresponding ones of the additional input-output operations from the respective processing cores of the host device to the storage system.

2. The apparatus of claim 1 wherein the at least one processing device comprises at least a portion of the host device.

3. The apparatus of claim 1 wherein said at least one processing device comprises at least one multi-path input-output driver of the host device and further wherein maintaining of the queue depth measures and controlling of the path selection based at least in part on the queue depth measures are performed at least in part by the at least one multi-path input-output driver of the host device.

4. The apparatus of claim 3 wherein the multi-path input-output driver comprises a lockless polled-mode driver implemented in a user space of the host device.

5. The apparatus of claim 1 wherein the plurality of paths over which the input-output operations are delivered from the host device to the storage system correspond to respective initiator-target pairs, the initiators of the initiator-target pairs comprising respective host bus adaptors of the host device and the targets of the initiator-target pairs comprising respective ports of the storage system.

6. The apparatus of claim 1 wherein the pending input-output operations comprise respective input-output operations that have been sent from the host device to the storage system over the path but have not yet completed processing in the storage system.

7. The apparatus of claim 1 wherein the processing cores implement respective ones of a plurality of lockless polled-mode drivers and further wherein the inter-core messages are received in the first processing core from the lockless polled-mode drivers of respective ones of the other processing cores.

8. The apparatus of claim 1 wherein controlling path selection for delivery of additional input-output operations from the host device to the storage system based at least in part on the queue depth measures maintained for the plurality of paths comprises implementing in each of a plurality of lockless polled-mode drivers of the host device an adaptive load balancing algorithm that utilizes the queue depth measures.

9. The apparatus of claim 8 wherein a given one of the adaptive load balancing algorithms is configured to select for delivery of a given one of the additional input-output operations a particular path having a lowest queue depth measure of the plurality of queue depth measures maintained for respective ones of the plurality of paths.

10. A computer program product comprising a non-transitory processor-readable storage medium having stored therein program code of one or more software programs, wherein the program code, when executed by at least one processing device comprising a processor coupled to a memory, causes the at least one processing device:

to maintain in a host device a plurality of queue depth measures for respective ones of a plurality of paths over which input-output operations are delivered from the host device to a storage system; and to control path selection for delivery of additional input-output operations from the host device to the storage system based at least in part on the queue depth measures maintained for the plurality of paths;

wherein a given one of the queue depth measures provides an indication of a number of pending input-output operations for the corresponding path; and wherein the at least one processing device comprises a plurality of processing cores of the host device and further wherein a first one of the plurality of processing cores is designated from among the plurality of processing cores to update the queue depth measures on behalf of all of the processing cores and is configured to update the queue depth measures for respective ones of the plurality of paths based at least in part on inter-core messages received by the first processing core from respective other ones of the plurality of processing cores, the inter-core messages received by the first processing core from the respective other ones of the plurality of processing cores indicating respective numbers of pending input-output operations for the respective other ones of the processing cores, the inter-core messages being stored in a lockless circular ring buffer of the first processing core;

the first processing core obtaining information from respective ones of the inter-core messages received from the respective other ones of the processing cores, and generating the updated queue depth measures utilizing the obtained information, the information indicating, for a corresponding one of the respective other ones of the processing cores, one or more pending input-output operations of that processing core for at least one of the plurality of paths;

the updated queue depth measures generated by the first processing core being utilized by each of the first processing core and the other ones of the processing cores in selecting paths for delivery of corresponding ones of the additional input-output operations from the respective processing cores of the host device to the storage system.

11. The computer program product of claim 10 wherein the at least one processing device comprises at least one multi-path input-output driver of the host device and further wherein maintaining of the queue depth measures and controlling of the path selection based at least in part on the queue depth measures are performed at least in part by the at least one multi-path input-output driver of the host device.

12. The computer program product of claim 10 wherein the pending input-output operations comprise respective input-output operations that have been sent from the host device to the storage system over the path but have not yet completed processing in the storage system.

13. The computer program product of claim 10 wherein the processing cores implement respective ones of a plurality of lockless polled-mode drivers and further wherein the inter-core messages are received in the first processing core from the lockless polled-mode drivers of respective ones of the other processing cores.

14. A method comprising:

maintaining in a host device a plurality of queue depth measures for respective ones of a plurality of paths over which input-output operations are delivered from the host device to a storage system; and controlling path selection for delivery of additional input-output operations from the host device to the storage system based at least in part on the queue depth measures maintained for the plurality of paths;

wherein a given one of the queue depth measures provides an indication of a number of pending input-output operations for the corresponding path;

wherein at least one processing device comprises a plurality of processing cores of the host device and further wherein a first one of the plurality of processing cores is designated from among the plurality of processing cores to update the queue depth measures on behalf of all of the processing cores and is configured to update the queue depth measures for respective ones of the plurality of paths based at least in part on inter-core messages received by the first processing core from respective other ones of the plurality of processing cores, the inter-core messages received by the first processing core from the respective other ones of the plurality of processing cores indicating respective numbers of pending input-output operations for the respective other ones of the processing cores, the inter-core messages being stored in a lockless circular ring buffer of the first processing core;

the first processing core obtaining information from respective ones of the inter-core messages received from the respective other ones of the processing cores, and generating the updated queue depth measures utilizing the obtained information, the obtained information indicating, for a corresponding one of the respective other ones of the processing cores, one or more pending input-output operations of that processing core for at least one of the plurality of paths;

the updated queue depth measures generated by the first processing core being utilized by each of the first processing core and the other ones of the processing cores in selecting paths for delivery of corresponding ones of the additional input-output operations from the respective processing cores of the host device to the storage system; and wherein the method is performed by the at least one processing device, the at least one processing device comprising a processor coupled to a memory.

15. The method of claim 14 wherein the at least one processing device comprises at least one multi-path input-output driver of the host device and further wherein maintaining of the queue depth measures and controlling of the path selection based at least in part on the queue depth measures are performed at least in part by the at least one multi-path input-output driver of the host device.

16. The method of claim 14 wherein the pending input-output operations comprise respective input-output operations that have been sent from the host device to the storage system over the path but have not yet completed processing in the storage system.

17. The method of claim 14 wherein the processing cores implement respective ones of a plurality of lockless polled-mode drivers and further wherein the inter-core messages are received in the first processing core from the lockless polled-mode drivers of respective ones of the other processing cores.

18. The method of claim 14 wherein the queue depth measures comprise respective per-path queue depth measures each indicating, for a particular corresponding initiator-target nexus, a number of currently in-flight input-output operations previously dispatched over the corresponding path.

19. The method of claim 14 wherein the first processing core is designated from among the plurality of processing cores to update the queue depth measures for respective ones of the plurality of paths.

20. The method of claim 14 wherein the inter-core messages comprise respective asynchronous messages received from each of the other processing cores.

* * * * *